United States Patent
Lawrence

[15] 3,653,429
[45] Apr. 4, 1972

[54] WATER HEATING SYSTEM

[72] Inventor: Willis Thompson Lawrence, Winchester, Mass.

[73] Assignee: Hooker Chemical Corporation, Niagara Falls, N.Y.

[22] Filed: May 6, 1969

[21] Appl. No.: 822,243

[52] U.S. Cl. ................................................165/1, 165/107
[51] Int. Cl. .........................................................F28d 15/00
[58] Field of Search ..........................237/1, 56, 81; 60/26; 165/105–107

[56] References Cited

UNITED STATES PATENTS

| | | | |
|---|---|---|---|
| 1,002,768 | 9/1911 | Shuman | 60/26 |
| 1,069,949 | 8/1913 | Hassler | 219/70 |
| 2,933,885 | 4/1960 | Benedek | 60/26 |
| 3,033,538 | 5/1962 | Iddles et al. | 165/107 X |
| 3,382,917 | 5/1968 | Rice | 165/107 X |
| 3,382,919 | 5/1968 | Rice | 165/105 |

*Primary Examiner*—Edward J. Michael
*Attorney*—Peter F. Casella, Donald C. Studley and Richard K. Jackson

[57] ABSTRACT

Several heat storage modules may be connected by manifold means to one or more water holding tanks. The heat storage modules may be connected either in parallel or series to water holding tanks. A single water holding tank may be employed in which a separate condenser is provided for each heat storage module or in which a common condenser is employed within the water holding tank. Furthermore, several heat storage modules may be connected in series to a single water holding tank. The provision of several heat storage modules in conjunction with one or more water holding tanks effects a more dependable water heating system by providing larger heat storage capacity, more constant heat delivery over a given period of time, and more convenient unit size.

4 Claims, 4 Drawing Figures

WATER HEATING SYSTEM

BACKGROUND OF THE INVENTION

Water heating systems employing a water holding tank, heat storage system and a means for transferring heat from the storage unit to the water in the holding tank are known. Conventionally, water is used as the heat transfer medium between the heat storage material and the water in the holding tank. The water (heat transfer medium) is passed in heat transfer relationship through a conduit which is surrounded by the heat storage material. The water (heat transfer medium) is vaporized. The vapor passes in heat transfer relationship through a condenser within the water of the holding tank, where it gives up its heat. The condensed heat transfer medium is removed from the water holding tank and held in a condensate reservoir from which it is pumped back into heat transfer relationship with the heat storage material to complete a transfer cycle.

Alkali metal hydroxide compositions are preferred heat storage media because of their high heat storage capacities. Other attributes of the alkali metal hydroxide compositions which make them especially adaptable as heat storage medium are their high heat of fusion, broad operative temperature ranges, relative inertness and low vapor pressure. In practice, the temperature of an alkali metal hydroxide heat storage composition is usually maintained between about 200° to 900° F., although heat may be stored at temperatures as high as about 1,250° F. and above for certain applications. The alkali metal hydroxides themselves have melting points which range from about 522° F. for cesium to about 842° F. for lithium. The incorporation of additives such as corrosion inhibitors and non-reducing agents into the alkali metal hydroxide heat storage composition affords mixtures with different melting points.

The alkali metal hydroxide compositions are superior to previously used heat storage media that depends upon heat of crystallization rather than heat of fusion for their heat storage capacity. However, due to the wide temperature ranges applicable to heat storage and alkali metal hydroxide compositions, special problems occur which require the development of novel apparatus to achieve the most economical heat storage and delivery system while keeping the respective units at a convenient size.

Sodium hydroxide compositions normally contain solids up to within the range of about 450° to 650° F. The liquid begins to form at about 450° F. providing a solid-liquid mixture up to about 650° F. During the heat storage cycle, the sodium hydroxide composition may be heated to temperatures as high as about 1,250° F. Normal operating conditions range from about 200°–900° F.

It is an object of this invention to provide a heating system which embodies facilities of improved heat storage capacity while keeping the units of the system at a convenient size.

It is a further object of this invention to provide a heating system which embodies heat storage units capable of delivering heat via a heat transfer medium at different heat delivery rates.

Furthermore, it is an object of this invention to provide heating systems which embody heat storage units with maximum heat storage efficiency.

A BRIEF SUMMARY OF THE INVENTION

In accordance with this invention there is provided a heating system comprising at least one fluid storage tank, plural heat storage vessels and a conduit means for heat transfer medium passing through the heat storage vessels and the fluid storage tank, said conduit forming a condenser in the fluid holding tank. The heat storage vessels may be connected either in parallel or in series to one or more fluid storage tanks via manifold means. Optionally, either one condenser may be disposed within the fluid storage tank for several heat storage vessels or separate condensers may be used for each heat storage vessel. Likewise, one or more condensate reservoirs may be used in accordance with this invention.

To be more specific, to provide greater heat capacity, while keeping the units at a convenient size, it may be desirable to couple two or more heat storage vessels together. This may be done in several ways and the proper choice depends on the specific application. Where it is desirable to couple fluid storage tanks in parallel, complete heat storage vessels including separate fluid storage tanks may be connected in parallel by manifolds on the inlets and outlets of the fluid storage tanks.

In another application, several heat storage vessels may be connected in parallel with a single fluid storage tank by one or more of the following methods.

First, separate condensers and condensate reservoirs may be used. Second, several condensers may be connected to drain into a common condensate reservoir. Third, a single condenser consisting of parallel coils joined at the entrance to the condensate reservoir may be employed. Fourth, a single condenser disposed in the fluid storage tank may be employed by joining the steam lines from the heat storage vessels before they enter the condenser. In this situation, solenoid valves or a check valve of equivalent function may be employed to prevent steam from one heat storage vessel from passing through another heat storage vessel directly into the condensate reservoir.

In the case of parallel coupling to a common fluid storage tank, each heat storage vessel is equipped with an independent pump and motor operated by a thermostat in the fluid storage tank. These thermostats may be set at different temperatures so that different heat delivery rates are available. If more water is drawn than the first heat storage vessel can heat, the water temperature will drop and cause the next heat storage vessel to operate. This arrangement also has the effect of increasing the storage efficiency of the system by saving the heat storage vessels with the slightly lower thermostat settings until those of higher settings are depleted.

When desired, several heat storage vessels may be connected in series with a single fluid storage tank. In this arrangement a single pump will circulate water through the heat storage vessels. Initially all the water will be vaporized in the steam coil of the first heat storage vessel and only steam will pass through the later ones. When the first heat storage vessel has become too cool to vaporize the heat transfer medium, liquid heat transfer medium will pass through it and into the second heat storage vessel from whence it will be emitted in the vaporized state. With this system, only one heat delivery rate is available, but maximum storage efficiency is achieved.

The heat storage material may be heated by a conventional means such as hot gases, solar energy converted to heat, or electrical heaters. The ready availability of low cost off-peak electrical energy makes electrical resistance heaters the most desired heating means because of their efficiency in the production of a low cost heat supply.

By utilizing more than one heat storage vessel, the amount of heat that may be stored becomes a multiple of the number of storage units. However, the greatest benefit of such a system resides in the economic use of off-peak electrical current, minimized storage or housing area needed, convenient storage unit size, and probably of greatest importance the ability of delivering large amounts of heat over a greatly extended period of time or the possibility of delivering heat at variable temperatures depending upon the desired heat requirements of a specific application.

DETAILED DESCRIPTION OF THE INVENTION

The present invention provides a novel approach to the process of supplying large amounts of heat with very rapid delivery through a heat storage system. Likewise, to provide greater heating capacity while keeping heat storage units and fluid holding tanks at a convenient size, the instant invention satisfies a long felt need in the industry.

The various aspects of the features of this invention will become apparent from the following description of the accompanying drawings in which.

Figure 1:
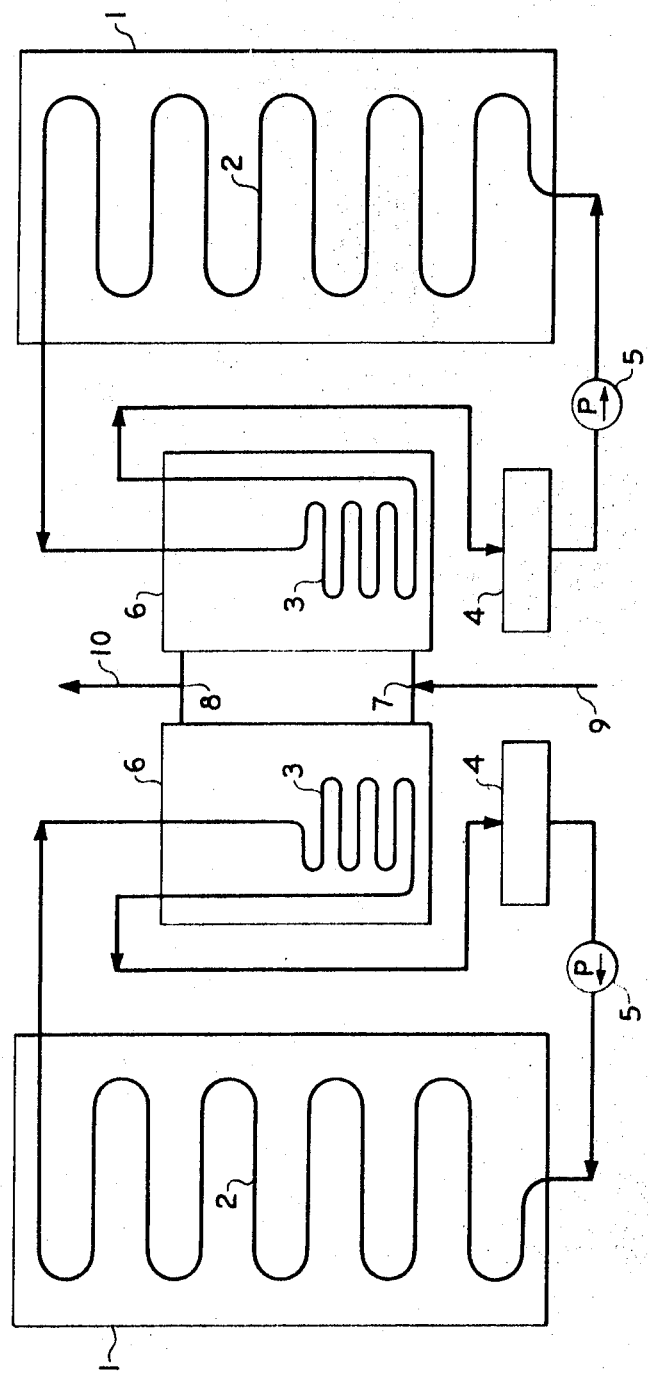
FIG. 1 is a diagrammatic representation of the two heat storage vessels connected to two fluid storage tanks in parallel by fluid storage tank manifolds.

Referring to FIGS. 1–4, heat storage vessel 1 houses a substantially anhydrous alkali metal hydroxide heat storage composition. Heat transfer medium conduit 2 traverses the heat storage material exits the heat storage vessel and passes into the fluid storage tank 6, into a condenser 3 from which condensed heat transfer medium exits the fluid storage tanks 6 passing into the condensate reservoir 4. Pump 5 causes the heat transfer medium to circulate through the system. The fluid storage tanks 6 are provided with inlet means 9 and outlet means 10. A manifold 7 is disposed in the fluid inlet means 9. Likewise a manifold 8 is disposed in the outlet means 10 from which heated fluid exits.

Figure 2:
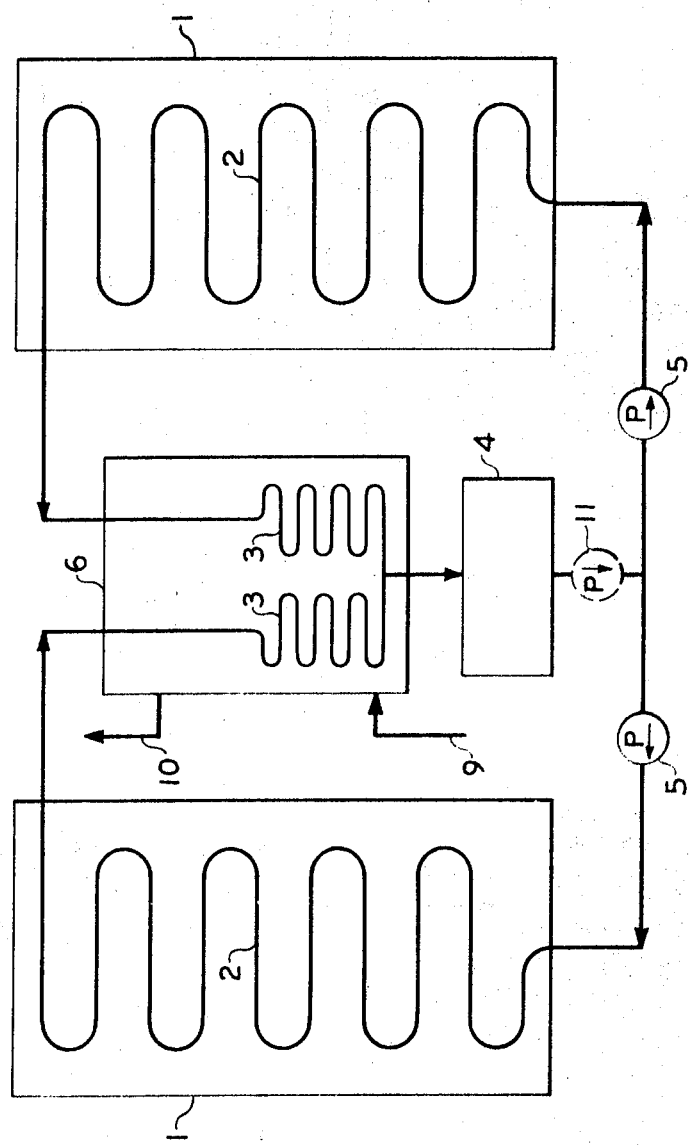
FIG. 2 is a diagrammatic representation of two heat storage vessels connected in parallel with a single fluid storage tank in which either separate condensers or parallel coils in a single condenser are disposed.

FIG. 2 represents a variation in which two heat storage vessels are provided with parallel connections to a single fluid storage tank 6. One condenser 3 is provided for each heat storage vessel. A single condensate reservoir 4 collects the condensation from each condenser. Separate pumps 5 may be employed to recycle the condenser heat transfer medium or alternatively a single pump 11 may be employed.

Figure 4:
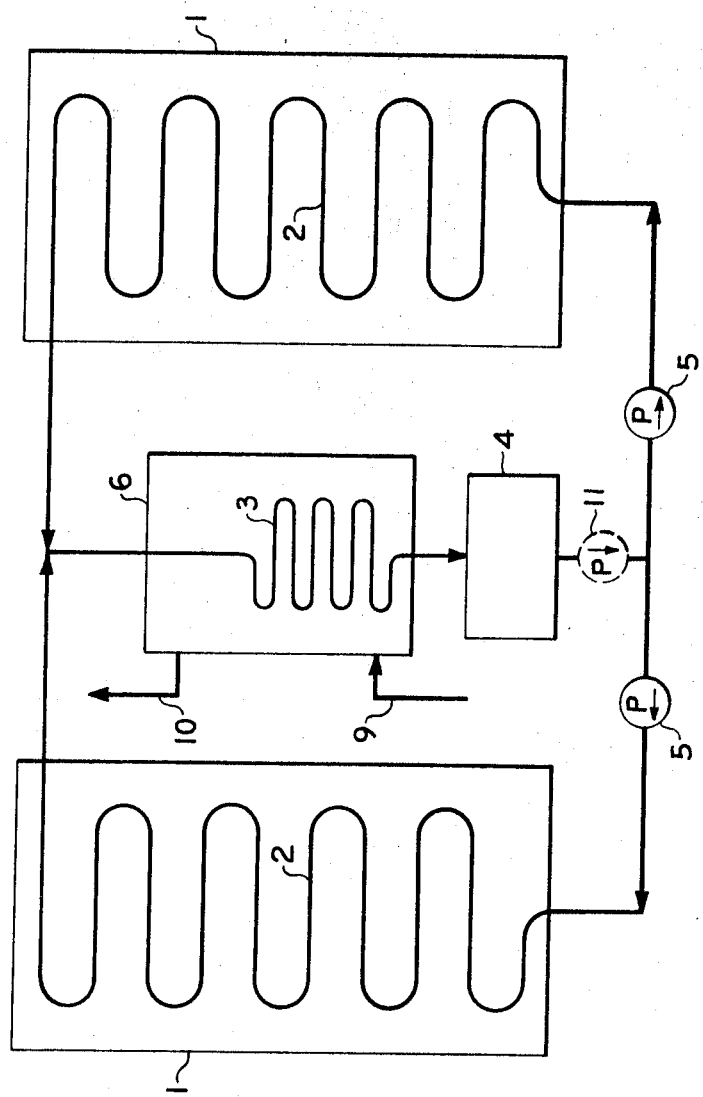
FIG. 4 is a diagrammatic representation of two heat storage vessels connected in parallel with a single fluid storage tank in which a common condenser is disposed.

FIG. 4 represents an additional variation in which two heat storage vessels are provided with parallel connections to a single fluid storage tank 6 in which a single condenser 3 is disposed. Pump 5, or optionally pump 11, serve to circulate the heat transfer medium from the condensate reservoir 4 to its heat storage vessels 1.

In operation, heat transfer medium is pumped by pump 5 into the heat storage vessel 1 via conduit 2. The heat transfer medium is heated by the heat storage material contained in 1 to form a vapor which passes into the fluid storage tank 6 and condenses in condenser 3. The condensed heat transfer medium leaves the fluid storage tank 6 and passes into the condensate reservoir 4 from which pump 5 recycles the heat transfer medium. The cold fluid which is to be heated is passed into the fluid inlet 9, from which it is divided by manifold 7 into the separate fluid storage tanks 6 depicted in FIG. 1 or through which it flows directly into the fluid holding tank depicted in FIGS. 2 and 4, for heating. The heated fluid is withdrawn from the fluid storage tanks 6 via hot fluid outlet line 10, after having been combined in manifold 8 of FIG. 1 or directly from line 10 as shown in FIGS. 2 and 4.

Optionally in the system shown in FIGS. 2 and 4, separate thermostats controlling pumps 5 or alternately pump 11 with valves (not shown) in place of pumps 5 may be employed in the fluid holding tank to provide different settings such that heat will be withdrawn from one heat storage vessel until the temperature of the heated fluid in the fluid storage tank 6 falls to a predetermined point. At this time, the thermostat controlling circulation of heat transfer medium to a second heat storage vessel activates its pump or a valve which cause heat transfer medium to be passed through the second heat storage vessel. If more fluid is withdrawn from the fluid storage tank 6 than the first heat storage vessel can heat, the fluid temperature will drop causing the second heat storage vessel to operate. This has the effect of providing two different heat delivery rates and it increases the storage efficiency of the system by saving the heat storage vessel controlled by a slightly lower thermostat setting until the heat has been depleted from those heat storage vessels having higher thermostat settings.

Figure 3:
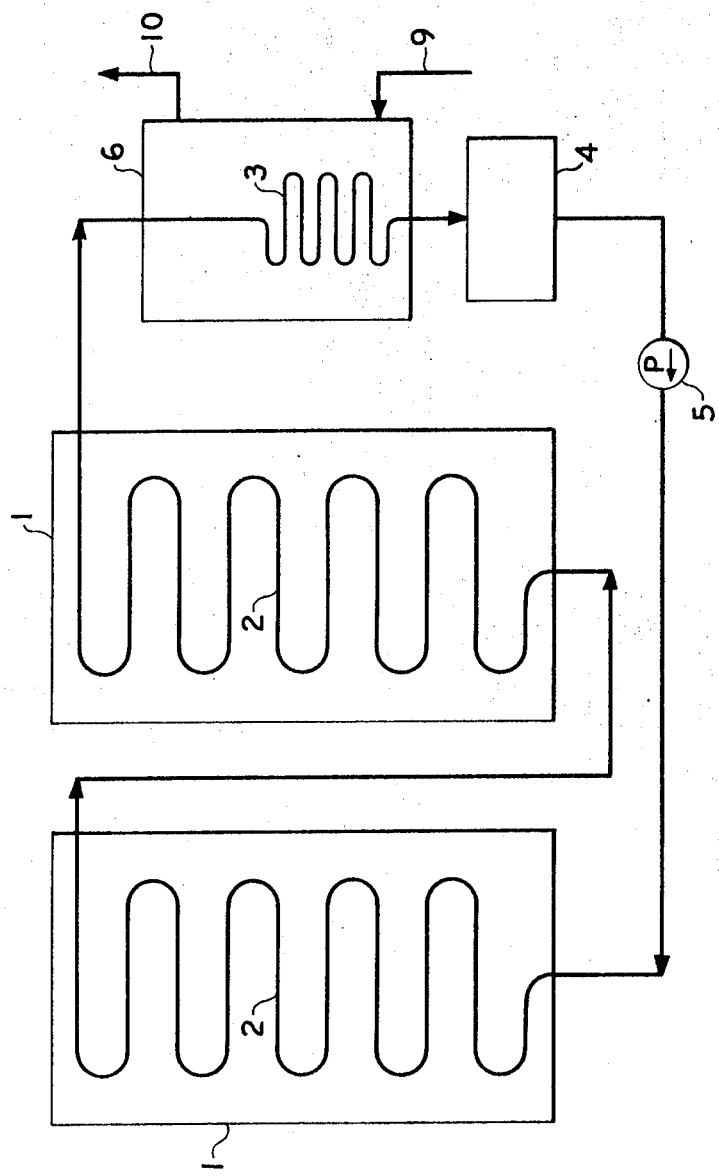
FIG. 3 is a diagrammatic representation of two heat storage vessels connected in series with a single fluid storage tank.

FIG. 3 represents the series connection of heat storage vessels. The system described in FIG. 3 is designed to provide one heat delivery rate from more than one heat storage vessel. This single heat delivery rate is in essence derived from a heat storage system in which the storage efficiency is maximized. The heat transfer medium is initially vaporized in the first heat storage vessel from whence it passes to another heat storage vessel in series. As the heat is depleted from each heat storage vessel in series the heat is utilized from the subsequent heat storage vessel.

While there have been described various specific embodiments of the invention, the apparatus process described herein is not intended to be a limitation upon the scope of the invention, as it is realized that changes therein may be made which do not depart from the true spirit of this contribution.

What is claimed is:

1. A method of delivering heat from more than one heat storage vessel housing a substantially anhydrous alkali metal hydroxide heat storage composition to a color substance which comprises extracting heat by sequentially passing a normally liquid heat transfer medium 1. into heat transfer relationship with at least one body of said heat storage composition until the heat content of the heat storage composition falls to a predetermined level,
   2. subsequently passing said heat transfer medium into heat transfer relationship with at least one other body of said heat storage composition distinct from the body of (1), and
   3. continuously passing the heated transfer medium into heat transfer relationship with the cooler substance to be heated.

2. The process of claim 1 wherein the heat transfer medium extracts heat from said plural bodies of heat storage composition in parallel.

3. The process of claim 1 wherein the heat transfer medium extracts heat from said plural bodies of heat storage composition in series, to deliver heat at a constant rate for an extended period of time.

4. The process of claim 1 wherein said heat transfer medium is conveyed to said cooler substance and combined into a single stream for return into heat transfer relationship with said heat storage composition.

* * * * *

PO-1050
(5/69)

UNITED STATES PATENT OFFICE
CERTIFICATE OF CORRECTION

Patent No. 3,653,429                Dated  April 4, 1972

Inventor(s)   Willis Thompson Lawrence

It is certified that error appears in the above-identified patent and that said Letters Patent are hereby corrected as shown below:

Column 3, line 31 "condenser" should read ---condensed---.
Column 4, line 33 "color" should read ---cooler---.

Signed and sealed this 1st day of August 1972.

(SEAL)
Attest:

EDWARD M. FLETCHER, JR.          ROBERT GOTTSCHALK
Attesting Officer                Commissioner of Patents